United States Patent [19]

Alluto

[11] 4,291,543
[45] Sep. 29, 1981

[54] TEMPERATURE REGULATOR FOR HOUSEHOLD APPLIANCES

[75] Inventor: Luigi Alluto, Moncalieri, Italy

[73] Assignee: Indesit Industria Elettrodomestici Italiana S.p.A., Italy

[21] Appl. No.: 111,823

[22] Filed: Jan. 14, 1980

[30] Foreign Application Priority Data

Jan. 23, 1979 [IT] Italy .................. 67141A/79

[51] Int. Cl.³ .............. G05D 23/32; H03K 5/153
[52] U.S. Cl. .................. 62/158; 307/252 UA; 307/354
[58] Field of Search ............ 307/354, 358, 362, 273, 307/252 UA; 62/229, 158, 228; 362/91 G, 47; 340/595, 599

[56] References Cited

U.S. PATENT DOCUMENTS

| | | | |
|---|---|---|---|
| 3,614,473 | 10/1971 | Lindsay et al. | 307/273 |
| 3,882,328 | 5/1975 | Mazgy et al. | 307/252 UA |
| 3,955,102 | 5/1976 | Chi | 307/354 |
| 4,079,366 | 3/1978 | Wong | 236/47 |
| 4,167,858 | 9/1979 | Kojima et al. | 62/126 |

*Primary Examiner*—William E. Wayner
*Assistant Examiner*—Harry Tanner
*Attorney, Agent, or Firm*—Ostrolenk, Faber, Gerb & Soffen

[57] ABSTRACT

A circuit is described in which a triac is to be fired to allow voltage to be supplied to start a motor which powers the compressor of a refrigerator. In order that the triac is fired at zero-crossings of the voltage, the voltage is supplied to two comparators which are connected antiparallel with one another, and which are supplied with a reference voltage such that the voltage difference at the input terminals of each comparator represents the voltage at the triac terminals with no added d.c. component. The outputs of comparators supply a square-wave voltage with zero-crossings synchronized perfectly with those of the main voltage at the terminals of the triac. The square-wave voltages are passed via compacitors and diodes to a comparator which reserves a string of negative pulses synchronized with zero-crossings of the triac. If the comparator is gated by an IN signal indicating that the temperature is above a predetermined value, the pulses are fed via the transistor of the gate of the triac to fire it. The invention may be applied to other household appliances such as washing machines, cookers and the like.

21 Claims, 3 Drawing Figures

TEMPERATURE REGULATOR FOR HOUSEHOLD APPLIANCES

BACKGROUND OF THE INVENTION

The present invention relates to a temperature regulating device, for use on electrical household appliances, consisting of a temperature sensor which generates an electrical quantity depending on the temperature it is at, a signal translating circuit for processing the electrical quantity and producing a control signal and a regulating element which receives the control signal and acts accordingly on the appliance components on which temperature adjustment depends.

A device of the type described could be used, for example, on: refrigerators, ovens and washing machines.

Two different types of temperature regulator are currently used on these appliances: electromechanical and solidstate electronic regulators, both of which have drawbacks. The problems associated with the first type are typical of any electromechanical device: moving parts wear out in time to produce a fall in efficiency until the device actually breaks down; fine adjustment of component operation is difficult unless high-cost products are used; flexibility of the device is low if alterations prove necessary for improving machine operation.

Though none of these problems is found on electronic regulators, they have other drawbacks mainly due to the fact that they have only recently been applied to the household appliances mentioned above and there has not been sufficient time as yet for their application to be optimized. The major problem associated with solid-state regulators is correct control of the regulating element. This usually consists of a triac and the difficulty lies in the fact that it must receive the firing signal at precise times if it is to operate in such a way as to guarantee a long working life.

Further difficulty is encountered in handling the signal from the temperature sensor so as to ensure proper intervention of the heat regulating circuit under all operating conditions.

BRIEF DESCRIPTION OF THE INVENTION

With a view to mitigating at least some of the above problems, the present invention provides a temperature regulator for use on electrical household appliances, comprising a temperature sensor which generates an electrical quantity related to its temperature, a signal translating circuit for processing the electrical quantity and producing a control signal, temperature adjustment means, and a regulating element which receives said control signal and acts on said temperature adjustment means. The signal translating circuit comprises a detector circuit for detecting zero crossings of the voltage applied to said regulating element, the detector circuit comprises two voltage-comparator circuits each having a common terminal, two input terminals and an output terminal, the input terminals of one comparator being connected antiparallel with the input terminals of the other so that the output terminals provide two push-pull signals which vary sharply in amplitude at the zero crossings, the two push-pull signals being fed separately to further circuits of the signal translating circuit.

BRIEF DESCRIPTION OF THE DRAWINGS

The following detailed description and attached drawings showing the temperature regulator used on a refrigerator and in which.

The invention will now be described with reference to one of the appliances to which the temperature regulator may be fitted, in this case a refrigerator.

DETAILED DESCRIPTION OF THE PREFERRED EMBODIMENT

Figure 1:
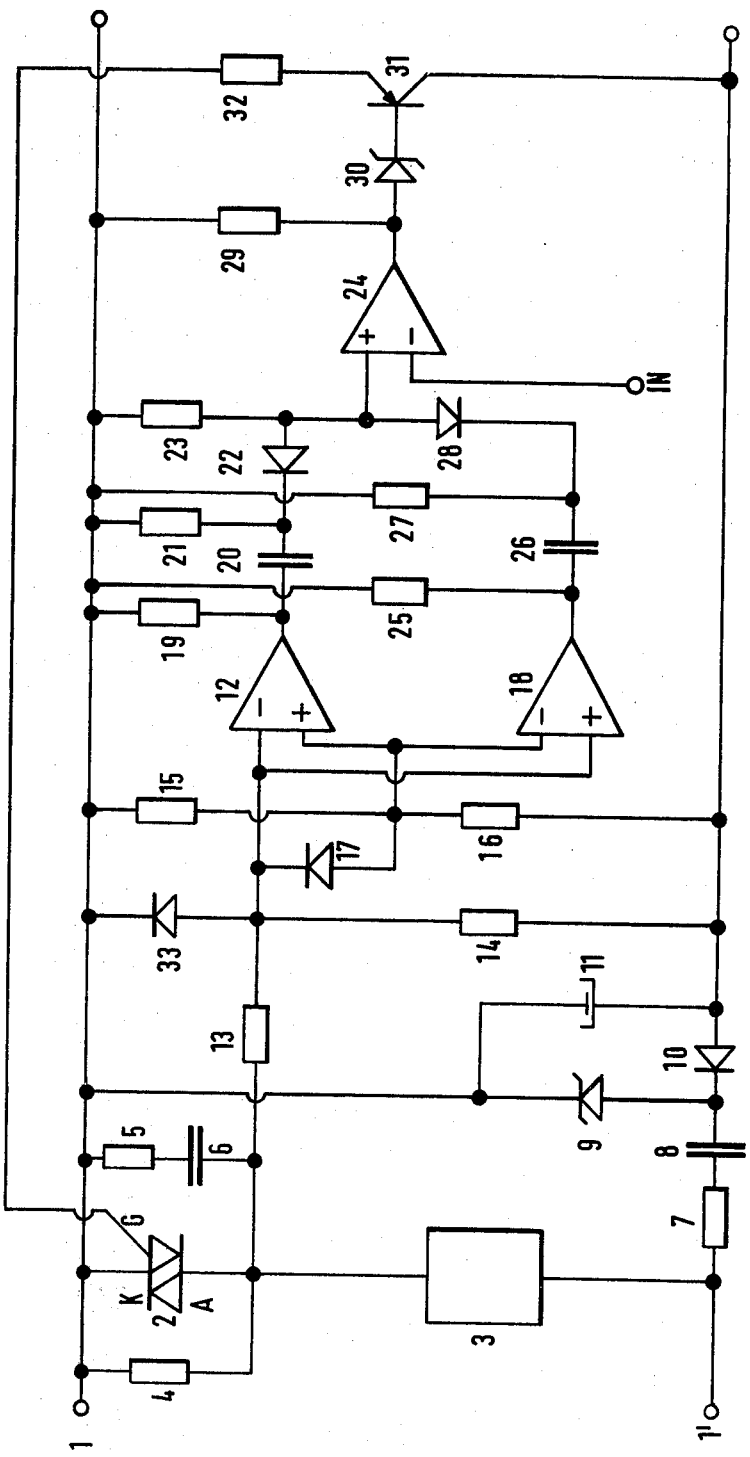
FIG. 1 shows a possible circuit arrangement of a first part of the temperature regulator according to the present invention.

In a refrigerator, the temperature inside the fresh or frozen food storage compartment is regulated by removing heat using an evaporator in which an appropriate fluid (e.g. Freon) is expanded. Evaporation occurs after the fluid has been compressed by a compressor and condensed by a condenser. The motor powering the compressor is controlled by a triac which, if fired by a control signal, allows voltage to be supplied for starting the motor. In FIG. 1, the terminals receiving the mains supply voltage are numbered 1-1', the triac 2 ad the motor representing the triac load 3.

Defrosting resistor 4 and the protection assembly consisting of resistor 5 and condenser 6 are both connected parallel to the terminals of triac 2. Resistor 7, condenser 8 and Zener diode 9 are connected in series between terminals 1-1'. Besides being connected to condenser 8, the anode of Zener diode 9 is also connected to the cathode of diode 10 the anode of which is connected via condenser 11 to terminal 1.

The voltage at the anode of triac 2 is supplied to the inverting input terminal of voltage comparator 12 via a voltage divider consisting of resistors 13 and 14. The non-inverting input terminal of comparator 12, on the other hand, receives a reference voltage supplied by the voltage divider consisting of resistors 15 and 16 located between terminal 1 and the anode of diode 10.

A limiting and protecting diode, 17, is connected between the input terminals of comparator 12 with its cathode connected to the inverting input terminal.

A second voltage-comparator circuit, 18, is connected antiparallel to the input terminals of comparator 12 (that is, with its non-inverted and inverting input terminals inverted with respect to comparator 12). The output terminal of comparator 12 is connected, at one end, to terminal 1 via resistor 19 and, at the other, to the first end of condenser 20 the second end of which is connected both to terminal 1, via resistor 21, and the cathode of diode 22. The anode of diode 22 is in turn connected to both terminal 1, via resistor 23, and the + non-inverting terminal of a third voltage-comparator circuit, 24.

The output of comparator 18 is connected, at one end, to terminal 1, via resistor 25 and, at the other, to the first end of condenser 26 the second end of which is connected to both terminal 1, via resistor 27, and the cathode of diode 28. The anode of diode 28 is connected to the non-inverting input terminal of comparator 24. The inverting input terminal of comparator 24 is the IN terminal for the control signal from the temperature sensor which enables operation of the triac for starting the compressor motor 3 when the temperature inside the refrigerator exceeds the preset threshold. Consequently, the output of comparator 24 is connected, at one end, to terminal 1 via resistor 29 and, at the other, to the anode of Zener diode 30. The cathode of Zener diode 30 is connected to the base of PNP transistor 31 the collector of which is connected directly to the anode of diode 1Q and the emitter of which is connected to the gate terminal of triac 2 via resistor 32. Finally, a limiting diode, 33, is connected between terminal 1 and the non-inverting input terminal of comparator 12.

Operation of the circuit described is as follows, bearing in mind that the FIG. 1 circuit is only part of the temperature regulator referred to in connection with the present invention, that is, the part for supplying pilot signals to triac 2. If we want to avoid using an insulating transformer (needed for power absorption reasons when the triac is fired by a d.c. pilot signal) but, for reasons of economy, a pulse signal triac check is preferred, (in which case, the transformer is not needed), the pilot pulses sent to the gate terminal for firing the triac must be received at precise times to ensure the triac is made conductive under optimum conditions. To be more precise, the triac must be fired the exact instant in which the mains voltage at its terminals is zero. In this way, the triac is spared from sharp variations in current and, more important, no radio noise is generated.

For the triac to be supplied with pilot pulses at the exact instant in which the mains voltage at its terminals crosses zero, a zero cross detecting circuit must be provided to control supply of the pilot signal at that precise time. Besides indicating the load (motor), low-voltage d.c. power unit and triac complete with its pilot circuit, the FIG. 1 circuit also shows the zero cross detecting circuit. This consists of two voltage comparators, 12 and 18, two diodes 22 and 28, and associated passive components. Operation is as follows. The voltage at the anode of triac 2 is picked up by resistor 13 and, after its amplitude has been limited by diodes 33 and 17, is sent to the non-inverting input terminal of comparator 12.

The function of resistor 14 is to provide a negative off-set voltage at the non-inverting input terminal of comparator 12 so as to make full use of the input dynamics of the comparator which can operate with input voltages ranging from 0 to the supply voltage of the comparator less 1.5 V. In the case shown, a negative offset voltage of about 2 V is supplied. The non-inverting input terminal of comparator 12, on the other hand, is supplied with a reference voltage for detecting when the mains voltage at the terminals of triac 2 crosses zero. This reference voltage is equal to the negative offset voltage supplied to the inverting input terminal of comparator 12 so that the difference in voltage between the two input terminals of comparator 12 is, in fact, the voltage at the triac terminals with no added d.c. component. The input terminals of comparator 18 will have the same voltages supplied to the input terminals of comparator 12 the only difference being a 180° phase displacement in that the terminals are inverted. This means the signal at the non-inverting input terminal of one comparator is also present at the inverting input terminal of the other and the same for the other pair of input terminals. Whenever the voltage difference at the input terminals of one comparator exceeds a few millivolts, the output of the comparator becomes positive or negative, depending on the sign of the voltage difference at the input, and switches sharply to equal almost the supply voltage of the comparator circuit. To simplify matters, the supply terminals have not been shown in FIG. 1 but each voltage comparator, of course, requires supply voltage for it to operate. On the circuit shown, this can be picked up at the terminals of condenser 11.

At the outputs of comparators 12 and 18, therefore, there will be a square-wave voltage with mains voltage frequency and zero crossings synchronized perfectly with those of the mains voltage at the terminals of triac 2. Also, the wave form at the output of comparator 12 will be in phase opposition to the one at the output of comparator 18. The voltage at the output of each comparator is then differentiated by a differentiating network consisting of condenser 20 and resistor 21 for comparator 12 and condenser 26 and resistor 27 for comparator 18. The time constant of these two differentiating networks is about one twentieth of the frequency of the mains voltage so that, for each transition in the output wave form from the comparators, that is, each time the mains voltage crosses zero, they produce a narrow pulse which may have positive or negative polarity depending on whether the voltage transition is from negative to positive or vice versa. Of these pulses, which are supplied at the same instant in which the mains voltage to triac 2 crosses zero, only the ones with negative polarity are allowed through by diodes 22 and 28 to the input of comparator circuit 24. This means only one out of two of the pulses produced by each differentiating network reaches comparator 24. Nevertheless, as the two outputs of comparator circuits 12 and 18 are in phase opposition, when, for example, diode 22 prevents a positive pulse from comparator 12 from getting through, at the same instant, a negative pulse is present at the output of differentiating network 25 and 26 which is allowed through by diode 28. In this way, a negative pulse is always present at the input of comparator circuit 24 whenever the mains voltage to triac 2 crosses zero. These pulses will be supplied alternately by either comparator 12 or 18.

Voltage comparator circuit 24, which acts as a switch and forms part of the triac 2 pilot circuit, receives the output signal from the zero cross detecting circuit and, if there is an enabling signal over a given voltage at the IN terminal, allows the pulses generated by the zero cross detecting circuit to be current amplified by transistor 31 and reach the triac 2 gate for firing it.

As the voltage supplied to the inputs of the zero cross detecting circuit is picked up at the triac terminals, the circuit senses when the voltage crosses zero at the critical point we are interested in controlling, when current is supplied to the motor. We could not get the same result if zero crossing was felt at terminals 1-1' with mains voltage. In the case of an inductive load, such as a compressor motor, the current-voltage phase displacement caused by such a load would lead to partialization of the voltage on the load if the triac was fired using the voltage at terminals 1-1' as a reference.

Up to now, we have described the running operation of the FIG. 1 circuit but, for a clear understanding of the invention, we must also examine the behaviour of the circuit during transient states when the regulator is turned on, that is, when mains voltage is supplied to terminals 1-1' on the circuit.

Note, first of all, that the circuits operating at low voltage as compared with mains voltage, are supplied by a power unit consisting of condensers 8 and 11 and diodes 9 and 10. Once the mains voltage has been supplied to terminals 1-1', it takes some time for the low voltage supplied by the power unit to reach the nominal value. During this time, the circuits which run on this voltage could operate badly. In particular, comparators 12 and 18, which are highly sensitive and can detect voltage differences of a few millivolts, could generate a continuous instead of a pulse pilot signal at their output. A continuous pilot signal would undoubtedly reach transistor 31 in that, with the refrigerator off, the temperature inside is bound to be high and an enabling signal bound to be present at the IN terminal.

Non-stop conduction of transistor 31 leads to greater current absorption than under running conditions thus causing overloading of the low-voltage power unit so that the voltage at its terminals is unable to rise above 2 or 3 Volts. Under these circumstances, the circuit falls into a deadlock it cannot get out of. To prevent this from happening, Zener diode 30 has been placed between the output of comparator 24 and the base of transistor 31. The function of Zener diode 30 is to create a voltage threshold of about 9 Volts and prevent any signal below 9 Volts from conducting transistor 31. Thanks to the delay caused by this diode, the output voltage from the low-voltage power unit has time to rise to a level at which no disturbance can be caused to the operation of comparators 12 and 18 or transistor 31.

One more aspect to be considered in connection with operation of the FIG. 1 circuit is when the mains voltage reaches terminals 1-1'. In FIG. 1, the low-voltage power unit comprises a capacitive divider consisting of condensers 8 and 11 and diodes 9 and 10. (The function of resistor 7 is to protect the circuit from overloading, not to create a voltage drop).

The decision to reduce the mains voltage using a capacitive divider, before rectifying it via diode 10, was not made to save on consumption (a resistive divider dissipates power which cannot be utilized). The real reason is more important from the point of view of circuit operation. When the low-voltage circuits were supplied by a power unit with a fall resistor in place of condenser 8, we discovered yet another drawback. During the interval in which the triac pilot pulses have surpassed the Zener diode 30 threshold but the voltage supplied by the low-voltage power unit has not yet reached its nominal value, a number of the pilot pulses fail to fire the triac. This is due to the fact that the voltage supplied by the low-voltage power unit has a ripple caused by the unit not leveling it properly and, more particularly, by the fact that is only rectifies one halfwave of mains voltage.

Consequently, the pilot pulse from the zero cross detecting circuit, that is supplied the exact instant the half-wave not rectified by diode 10 in the power unit crosses zero, finds a voltage at the terminals of transistor 31 which is the minimum supplied by the low-voltage unit on account of the ripple. The transistor therefore supplies less current than it would without the ripple. Hence, the possibility of the current supplied to triac 2 not being enough to fire it.

In the case of particularly "hard-firing" triacs, it is possible that, until the low voltage reaches its nominal value, one pilot pulse of every two is ineffective and the triac only conducts for a brief space of time, for a half-wave. This must be prevented at all costs, since operation of this sort interferes with the house electricity mains.

This is precisely what condenser 8 is provided for. By phase displacing the low and mains voltages, it prevents the pilot pulses from coinciding with minimum voltage from the low-voltage unit.

Finally, some mention should be made of resistor 4. This serves to defrost the evaporator on the refrigerator and defrosting is automatic. As resistor 4 is connected parallel to triac 2, it is shortcircuited when triac 2 is fired, that is, when the compressor motor is running, and operates when triac 2 is disabled. In the latter case, the current flowing through resistor 4 also flows through the compressor motor but without starting it in that it is about one hundredth of starting current.

The heat dissipated in resistor 4 is therefore used for defrosting the evaporator on the refrigerator which may frost up during operation of the compressor. Automation consists in the fact that, whenever cooling action ceases, defrosting commences without waiting for the evaporator to frost up completely.

We shall now take a look at the part of the temperature regulator consisting of the temperature sensor and circuit for handling the data from the sensor and transforming it into an enabling or block signal to be sent to the IN terminal of the FIG. 1 circuit.

Figure 2:
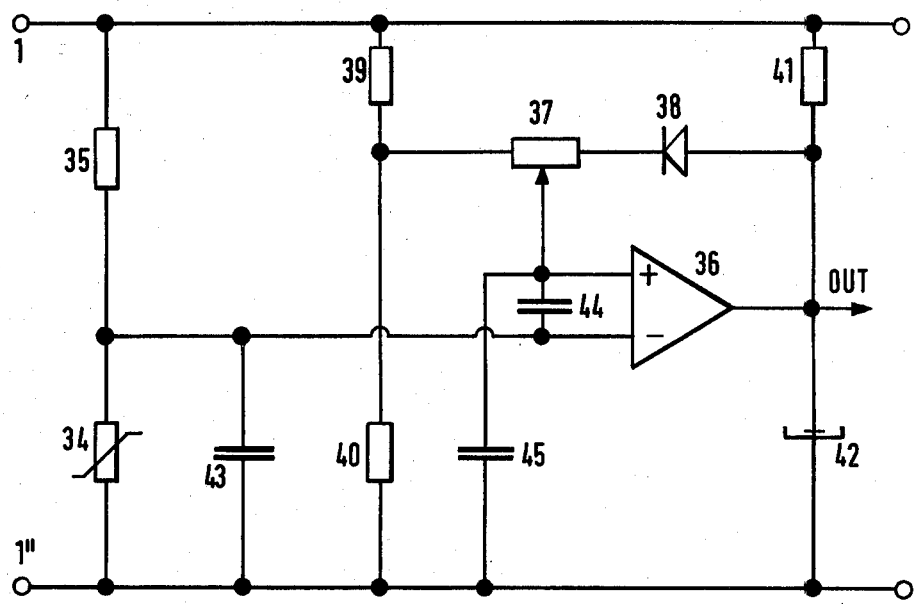
FIG. 2 shows a possible circuit arrangement of a second part of the temperature regulator according to the present invention.

FIG. 2 shows temperature sensor 34 consisting of an NTC (negative temperature coefficient) thermistor connected, at one end, directly to terminal 1'' and, at the other, to terminal 1 via resistor 35. The junction of thermistor 34 and resistor 35 is connected to the inverting input terminal of voltage comparator circuit 36. The non-inverting input terminal of comparator 36 is connected to the arm slide of potentiometer 37 which has one end connected to the cathode of diode 38 and the other to the junction of a resistive divider consisting of resistors 39 and 40. The resistive divider has its ends connected to terminals 1-1', whereas the anode of diode 38 is connected, at one end, directly to the output of comparator 36 and, at the other, to terminal 1 via resistor 41. Between the output of comparator 36 and terminal 1'' is connected condenser 42 which protects the circuit from electromagnetic noise. Three other antinoise condensers are arraned as follows: one, 43, parallel to thermistor 34, a second, 44, between the input terminals of comparator 36 and a third, 45, between the non-inverting input terminal of comparator 36 and terminal 1''.

The output of the FIG. 2 circuit is made available at the OUT terminal connected directly to the output terminal of comparator 36. The circuit described operates as follows. Terminals 1 and 1'' are the ones supplying the circuit and receive the low supply voltage made available at the terminals of condenser 11 in FIG. 1. The OUT terminal is connected directly to the IN terminal of FIG. 1 and supplies the enabling or block signals to comparator 24 in FIG. 1. The function of the FIG. 2 circuit is to manipulate the signal created by thermistor 34 and produce a control signal, depending on the temperature detected by thermistor 34, to enable or block the in-coming pilot signals to triac 2 in FIG. 1. The electrical quantity generated as a function of the temperature detected by the probe built into thermistor 34 is the resistance presented by the thermistor. The characteristic resistance/temperature curve showing the relationship between the two quantities can easily be drawn in that the main data is supplied by the thermistor manufacturer and can be found on the specifications accompanying the component.

For the type of application in question, the resistance/temperature characteristic of thermistor 34 must be as linear as possible. On the FIG. 2 circuit, thermistor 34 is assembled on one branch of a bridge circuit of which the other three branches are the ones incorporating resistors 35, 39 and 40. The off-balancing of the bridge caused by variations in the resistance of thermistor 34 is felt by voltage comparator 36. As the latter has a threshold and is highly sensitive, as soon as the temperature detected by thermistor 34 exceeds a given value, the voltage at the inverting input terminal of comparator 36 oversteps the threshold and the voltage at the output of the comparator switches rapidly to equal roughly the voltage at terminal 1. With this voltage at the OUT terminal, comparator 24 of FIG. 1 is enabled to let the pilot pulses through to transistor 31 and from there to the triac 2 gate.

In this way, the compressor motor is activated and the compartment being temperature controlled cooled by compression and expansion of the cooling liquid.

Provision is made on voltage comparator circuit 36 for hysteresis so that, once the voltage at the OUT terminal has risen to that at terminal 1, part of the voltage is sent back to the input by means of the feedback worked by diode 38 and potentiometer 37 so as to vary the threshold of the voltage present at the non-inverting input terminal of comparator circuit 36. Varying this threshold also varies the temperature detected by the probe and at which the compressor motor is stopped. The reason hysteresis is needed is that, for the refrigerator to work well, it must be allowed to run for a certain length of time, during which the temperature detected by the probe falls by as much as 20° below the threshold which started up the compressor, before the motor is stopped again. Diode 38 has an important function in that it only allows hysteresis to occur one way, that is, it only allows the voltage at the output terminal of comparator 36 to be sent back to the input when it is 0.6 V higher than the voltage at the cathode terminal of diode 38 itself. In this way, the threshold is only affected when the output voltage of comparator 36 is high, that is, after the compressor motor has been activated, whereas, when the output voltage is low and the compressor motor not running, the threshold is unaffected by feedback in that diode 38 is non-conductive. In other words, diode 38 insulates the resistor bridge from the feedback circuit when the motor is idle.

The important advantage of this is that the motor is connected at constant temperature, e.g. +4° C., and disconnected at variable temperatures, adjusted by means of potentiometer 37, and ranging, for example, between −16° and 25° C. as the user prefers.

Adjusting the slide on potentiometer 37 varies the feedback voltage applied to the input of comparator 36. The slide knob is outside the device so the user can regulate the temperature inside the refrigerator as required. This adjustment, however, does not affect the temperature at which the motor is connected thus enabling this fixed value to be set by the designer on the grounds of optimum operation of the device. Going by the variations in resistance of thermistor 34, the FIG. 2 circuit therefore causes the output of comparator 36 to switch from low to high or vice versa so as to enable or block operation of the compressor motor.

Enabling always occurs when the temperature detected by the probe reaches a given value whereas blocking occurs at variable temperature.

Figure 3:
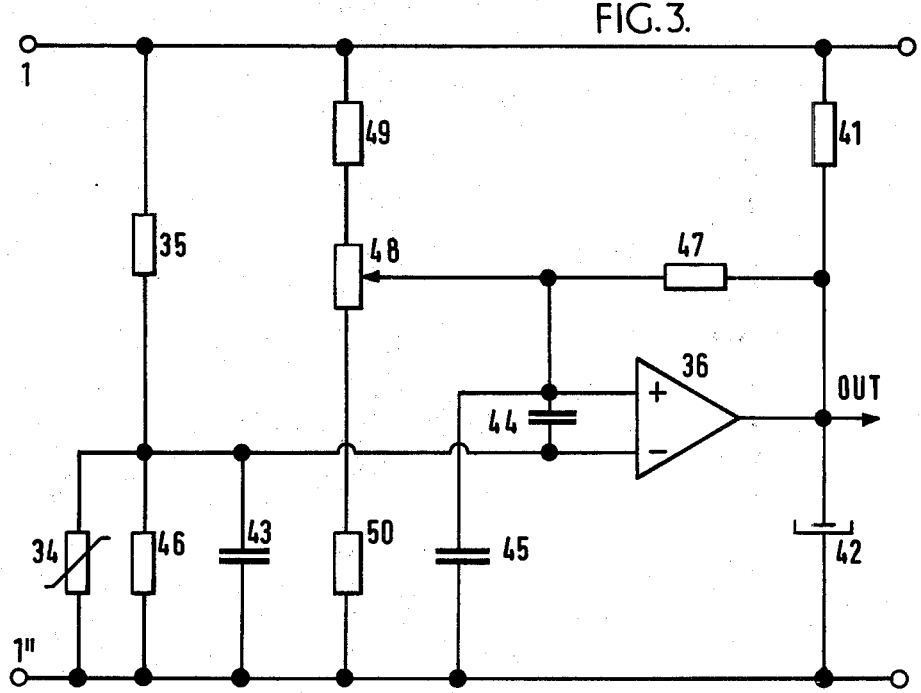
FIG. 3 shows a variation of the FIG. 2 arrangement.

FIG. 3 shows a circuit variation to the FIG. 2 device by which the compressor is both enabled and blocked at variable temperatures detected by the probe.

FIGS. 2 and 3 are very similar so that parts common to both are indicated by the same numbers used in FIG. 2. Part arrangement is also similar to that of FIG. 2 so that only the differences are shown hereafter. These are essentially two. The first consists in the fact that a resistor, 46, is connected parallel to thermistor 34, for further curve linearization of the resistance at the inverting input terminal of comparator 36. The second difference lies in the circuit for providing hysteresis to comparator 36. In place of potentiometer 37 and diode 38 in FIG. 2, there is a single feedback resistor, 47. The temperature regulating potentiometer, 37, is replaced by potentiometer 48 which has its ends connected between resistors 49 and 50 and its slide connected directly to the non-inverting input terminal of comparator 36. Resistors 49 and 50 are assembled in the same way as 39 and 40 in FIG. 2.

Operation of the FIG. 3 circuit is as follows. Like the FIG. 2 circuit, the function of this one is to manipulate the signal created by thermistor 34 so as to produce a control signal, depending on the temperature detected by thermistor 34, for the in-coming pilot signals to triac 2 of FIG. 1.

In the case of the FIG. 3 circuit, however, both connection and blocking of the motor can be regulated by means of potentiometer 48. The hysteresis of comparator circuit 36 is effective in both situations and guarantees a constant connection/block voltage differential of, for example, about 10° C. The adjustment made using potentiometer 48 affects the reference value set by the voltage divider which also includes resistors 49 and 50.

The feedback voltage responsive for hysteresis and the reference voltage are supplied with overlapping effect in parallel to the non-inverting input terminal of comparator 36. Consequently, by manipulating potentiometer 48, the motor connecting threshold can be raised or lowered (e.g. from −1° to −11° C.). As the differential produced by hysteresis is constant, this means the block threshold of the motor will also be shifted by the same amount (e.g. −12° to −22° C.). For the voltage and temperature thresholds to correspond satisfactorily, the temperature/resistance characteristic of thermistor 34 must be as linear as possible. For this to be achieved, resistor 46 has been added parallel to thermistor 34 even though this does involve a slight reduction in the sensitivity of the system.

Condensers 42, 43, 44 and 45 are very important for good operation of the circuit in that they act as by-passes for electromagnetic noise signals which may be picked up by the circuit and lead to false switching.

Another important point in connection with circuit performance is the stability afforded by the device in the face of variable running conditions. In the event of a change in room temperature, in particular, the circuit must maintain the values set for connecting and blocking the compressor. This is achieved quite simply using stable precision components on the parts of the circuit responsible for setting the intervention thresholds.

One more point: though the device shown comprises 4 voltage comparators, this makes it neither complex nor expensive in that all four are available on a single integrated circuit which only costs a little more than an integrated circuit containing a single comparator.

The following is a list, provided by way of an example, of the component ratings used for the FIGS. 1, 2 and 3 circuits which have been tested and found to work.

LIST OF RATINGS

| | | | |
|---|---|---|---|
| 2 triac | BT 162 | 27 resistor | 22 K Ω |
| 4 resistor | 2.5 K Ω | 28 diode | 1N914 |
| 5 resistor | 100 Ω | 29 resistor | 15 K Ω |
| 6 condenser | 0.1 μF | 30 Zener diode | 1N4733 |
| 7 resistor | 330 Ω | 31 transistor | 2N4403 |
| 8 condenser | 0.47 μF | 32 resistor | 50 Ω |
| 9 Zener diode | 1N4743 | 33 diode | 1N914 |
| 10 diode | 1N4005 | 34 thermistor | S243 |
| 11 condenser | 100 μF | 35 resistor | 4.87 K Ω |
| 12 I.C. | ¼ LM339 | 36 I.C. | ¼ LM339 |
| 13 resistor | 470 K Ω | 37 potentiometer | 5 K Ω max |
| 14 resistor | 2.2 M Ω | 38 diode | 1N914 |
| 15 resistor | 4.7 K Ω | 39 resistor | 37.4 K Ω |
| 16 resistor | 22 K Ω | 40 resistor | 11.3 K Ω |
| 17 diode | 1N914 | 41 resistor | 16.5 K Ω |
| 18 I.C. | ¼ LM339 | 42 condenser | 1 μF |
| 19 resistor | 47 K Ω | 43 condenser | 0.1 μF |
| 20 condenser | 47 nF | 44 condenser | 0.1 μF |
| 21 resistor | 22 K Ω | 45 condenser | 0.1 μF |
| 22 diode | 1N914 | 46 resistor | 3.32 K Ω |
| 23 resistor | 33 K Ω | 47 resistor | 34 K Ω |
| 24 I.C. | ¼LM339 | 48 potentiometer | 470 Ω |
| 25 resistor | 47 K Ω | 49 resistor | 7.68 K Ω |
| 26 condenser | 47 nF | 50 resistor | 2.43 K Ω |

The advantages of the described embodiment of the present invention will be clear from the description given, in particular: The reliability of the device owing to the elimination of all moving mechanical parts;

The low-cost precision of the system achieved by employing commonly-used electronic components;

Control of the motor regulator so as to start the triac at the right time and avoid overloading or generating electromagnetic noise;

Reliable operation of the device even under the worst running conditions;

Flexibility of the device enabling changes to be made to performance without having to alter the entire structure;

Low cost of the whole device which does not require a supply transformer and comprises a single integrated circuit containing all four voltage comparators.

To those skilled in the art, it will be clear that a number of variations can be made without, however, departing from the scope of the present invention.

For example, the voltage picked up at the terminals of triac 2 could be differentiated by a capacitive network so that the wave front of the voltage supplied to the inputs of comparators 12 and 18 is steeper when the voltage crosses zero and operation of the zero cross detecting circuit made even more accurate.

Other variations could involve both circuit parts on the device (e.g. a monostable circuit could be added between the zero cross detecting circuit output and transistor 31 for "shaping" the pilot pulses) and use on electrical household appliances other than a refrigerator.

Clearly, the device described could easily be fitted on any other electrical household appliance requiring a temperature regulator, such as washing machines, dishwashers, electric cookers, etc.

I claim:

1. A temperature regulator for use with an electrical household appliance, comprising:
   a temperature sensor for sensing the temperature of a portion of said electrical household appliance and generating an electrical quantity related thereto;
   a signal translating circuit for processing said electrical quantity and producing a control signal as a function thereof;
   temperature adjusting means for adjusting said temperature;
   a regulating element which receives said control signal and controls the operation of said temperature adjusting means as a function thereof;
   said signal translating circuit comprising a detector circuit for detecting zero crossings of a voltage applied to said regulating element, said detector circuit comprising two voltage comparator circuits each having two input terminals and an output terminal, the input terminals of one said comparator being connected anti-parallel with the input terminals of the other said comparator such that the output terminals of said comparators provide two push-pull signals which vary sharply in amplitude at said zero crossings, said two push-pull signals being fed separately to further circuits of said signal translating circuit; and
   delay means for preventing said control signal from activating said regulating element for a predetermined length of time, when said appliance is turned on, so as to allow the remainder of said temperature regulator to reach approximately its normal running condition before allowing said control signal to activate said regulating device.

2. A temperature regulator as claimed in claim 1, wherein the said signal translating circuit further comprises a first differentiating network for differentiating the signal at the output terminal of one of said voltage comparators to generate a pulse signal each time a sharp variation occurs in the amplitude of the said output signal.

3. A temperature regulator as claimed in claim 1, wherein first selection means are provided for selecting certain pulse signals from those produced by the said first differentiating network at the output of one of the two said comparators.

4. A temperature regulator as claimed in claim 3, wherein a second differentiating network is provided, connected to the output terminal of the other said voltage comparator, and wherein second selection means are provided for selecting certain pulse signals from those produced by the said second differentiating network.

5. A temperature regulator as claimed in claim 4, wherein said first and second selection means each comprise at least one diode which only passes pulse signals of a given polarity.

6. A temperature regulator as claimed in one of claims 4 or 5 wherein the signals selected by the said first and second selection means are added together and sent to a switch circuit which either sends them to the said regulating element or blocks them, depending on the state of an enabling signal supplied to it by an enabling circuit.

7. A temperature regulator as claimed in claim 6, wherein the said switch circuit comprises a third voltage-comparator circuit whose inputs received said pulse signals, added together, and the said enabling signal.

8. A temperature regulator as claimed in claim 7, wherein the said enabling circuit comprises a fourth voltage-comparator circuit with hysteresis, the inputs of said fourth voltage-comparator circuit receiving a reference voltage and a variable voltage which depends on the temperature detected by said sensor.

9. A temperature regulator as claimed in claim 8, wherein the resistance of said temperature sensor varies according to its temperature.

10. A temperature regulator as claimed in claim 9, wherein the said resistance variation of said sensor is converted into a voltage variation and is applied to one input terminal of fourth voltage-comparator circuit by means of a resistive reference voltage divider.

11. A temperature regulator as claimed in claim 8, wherein the said first, second, third and fourth voltage comparators form part of a single integrated circuit.

12. A temperature regulator as claimed in claim 1, wherein the said delay means comprises a Zener diode.

13. A temperature regulator as claimed in claim 1, wherein the said translating circuit comprises a further comparator circuit the inputs of which receive a signal depending on said electrical quantity and a reference signal, said further comparator circuit supplying an enabling signal for operating said regulating element, and wherein provision is made for hysteresis which is only active when the output signal from the further comparator circuit assumes a given value.

14. A temperature regulator as claimed in claim 13, wherein said electrical quantity is a resistance and the signals supplied to said further comparator circuit are a reference voltage and a voltage obtained by a resistive voltage divider including the said sensor.

15. A temperature regulator as claimed in claim 13, wherein said partially active hysteresis is obtained by placing a diode in a feedback circuit between an output and an input of said further comparator circuit.

16. A temperature regulator as claimed in claim 1, wherein said appliance is a refrigerator, and said temperature adjusting means includes a motor for activating a compressor.

17. A temperature regulator for use with an electrical household appliance, comprising:
  a temperature sensor for sensing the temperature of a portion of said electrical household appliance and generating an electrical quantity related thereto;
  a signal translating circuit for procesing said electrical quantity and producing a control signal as a function thereof;
  temperature adjusting means for adjusting said temperature;
  a regulating element which receives said control signal and controls the operation of said temperature adjusting means as a function thereof;
  said signal translating circuit comprising a detector circuit for detecting zero crossings of a voltage applied to said regulating element, said detector circuit comprising two voltage comparator circuits each having two input terminals and an output terminal, the input terminals of one said comparator being connected anti-parallel with the input terminals of the other said comparator such that the output terminals of said comparators provide two push-pull signals which vary sharply in amplitude at said zero crossings, said two push-pull signals being fed separately to further circuits of said signal translating circuit; and
  a power circuit for producing a low voltage D/C supply voltage from a mains voltage, said D/C voltage having a ripple voltage component during transient states when the appliance is turned on, said supply circuit including means for phase displacing said ripple and main voltages for safer control of said temperature regulator during said transient states.

18. A temperature regulator for use with an electrical household appliance, comprising a temperature sensor which generates an electrical quantity related to its temperature, a signal translating circuit for processing said electrical quantity and producing a control signal as a function thereof, temperature adjustment means for adjusting said temperature, and a regulating element which receives said control signal and varies the operation of said temperature adjustment means in response thereto, said signal translating circuit comprising:
  a detector circuit for detecting zero crossings of a voltage applied to said regulating element, said detector circuit comprising two voltage comparator circuits each having two input signals and an output terminal, the input terminals of one comparator being connected antiparallel with the input terminals of the other in such a manner that the output terminals of said comparators provide two push-pull signals which vary sharply in amplitude at said zero crossings;
  a first differentiating network for differentiating the signal at the output terminal of one of said voltage comparators to generate a pulse signal each time a sharp variation occurs in the amplitude of said output signal of said one of said voltage comparators;
  a second differentiating network connected to the output terminal of the other of said voltage comparators to generate a pulse signal each time a sharp variation occurs in the amplitude of said output signal of said other voltage comparator;
  first selection means for selecting certain pulse signals from those produced by said first differentiating network;
  second selection means for selecting certain pulse signals from those produced by said second differentiating network, said first and second selection means each comprising at least one diode which only passes pulse signals of a given polarity;
  said selected signals being added together and applied to a switch circuit which either sends them to said regulating element or blocks them, depending upon the state of enabling signal applied to said switch circuit by an enabling circuit, said switch circuit comprising a third voltage comparator circuit whose inputs receive said added selected pulse signals and said enabling signal; and
  said enabling circuit comprising a fourth voltage comparator circuit with hysteresis, the inputs of said fourth voltage comparator circuit receiving a reference voltage and a variable voltage which depends on the temperature detected by said sensor.

19. A temperature regulator as claimed in claim 18, wherein the resistance of said temperature sensor varies according to its temperature.

20. A temperature regulator as claimed in claim 19, wherein said resistance variation of said sensor is converted into a voltage variation and is applied to one input terminal of said fourth voltage comparator circuit by means of a resistance reference voltage divider.

21. A temperature regulator as claimed in claim 19, wherein said first, second, third and fourth voltage comparators formed part of a single integrated circuit.

* * * * *